UNITED STATES PATENT OFFICE.

JOHN N. HOFF, OF NEW YORK, N. Y.

FERTILIZER.

1,261,025.

Specification of Letters Patent.

Patented Apr. 2, 1918.

No Drawing.

Application filed September 29, 1917. Serial No. 194,002.

*To all whom it may concern:*

Be it known that I, JOHN N. HOFF, a citizen of the United States, residing at New York, in the county of New York and State of New York, have invented certain new and useful Improvements in Fertilizers, of which the following is a specification.

The object of this invention is to produce a fertilizer preferably containing adequate amounts of nitrogen, phosphorus and carrying beneficial soil bacteria, including those forming nodules, to form a plant food and soil inoculent capable of direct fertilizing action.

In one form, the invention embraces the incorporation of well decomposed organic matter such as humus or peat, with phosphate rock and soluble or acid phosphate. As an illustration of such a raw mix, I may take 2000 lbs. of the original material, 400 to 500 lbs. of ground phosphate rock and 100 to 200 lbs. of acid phosphate. There also may be included various other materials such as potash-containing rock including clays, potash-micas and the like, or hydrated silicates containing potash and crude organic ammoniates such as fleshings—leather refuse—hair wool waste or garbage.

The first step of the invention in its preferred form comprises a stage of digestion or treatment in which the material, of a character such, for example, as is mentioned above, is subjected to the action of moisture and heat and which, in one form of the invention may be effectively carried out by heating in a closed vessel with steam under two or three atmospheres pressure or even higher under some circumstances.

The object of this digestive treatment is to render the organic humus and other materials soluble and results in a humus material which in some cases has been found to afford at least fifteen times more effective nitrogen than ordinary humus offers. This conversion is due to the action of moisture and heat and is sufficiently complete in a few hours time under the pressure indicated. It is possible in some cases to operate under lower pressures, or even to carry out the digestion at atmospheric pressure, in which case the time required is prolonged as required.

During this heat treatment or digestion stage, a reaction takes place between the soluble phosphate and the phosphate rock, converting a large portion of this material into the reverted form, which is desirable for fertilizers to be supplied to sensitive plants. Acid phosphate applied even in small proportion burns up the roots. Furthermore it has a tendency to prevent the rapid growth of nodules as strongly acid material is prejudicial to their development. The conversion of the soluble acid phosphate into material of this character in this manner, *in situ*, yields a product which is not harmful to the growth of bacteria with which the material is inoculated.

A further object of the invention is to provide a balanced fertilizer which contains the ordinary mineral ingredients necessary for fertilizers in such ratios as will be conducive to good results in a general way so that the fertilizer may have the widest possible application. As stated most forms of bacteria are easily destroyed by mineral substances such as strong solutions of salts or acids, yet, in accordance with the present invention it is important to inoculate the fertilizer with all the species of the bacteria which are desirable in producing the highest condition of tilth. In meeting these seemingly incompatible conditions, the present invention provides a means of balancing or adjusting to secure an all around fertilizer, capable of containing in a living, active state, the maximum number of beneficial soil bacteria.

After conversion of the phosphate rock into phosphate as indicated, with more or less modification of the soluble phosphate, to minimize its acid qualities, I may further modify or neutralize any acids present and render the material a better nutrient medium for bacteria by addition of a small quantity of a soluble alkali, such, as for example 5 to 10 lbs. of sodium carbonate to the ton of the mixture. Other alkalis may be used in place of the sodium carbonate, in which case a like or larger amount may be employed. While not as desirable, it also is possible to use caustic soda as a neutralizing agent. Quicklime or hydrated lime is an excellent agent for rendering the soil of the proper degree of alkalinity or sweetness, to afford the proper medium for the soil bacteria employed in the present invention. 20 lbs. of hydrated lime may be used to the ton and when carbonate of calcium is used which is desirable especially in conjunction with hydrate of calcium, approximately 50 to 100 lbs. of the carbonate may be added to a ton of the material.

Carbohydrates are formed to a considerable extent by digestion of the mass and are highly desirable food for bacterial growth. The conversion of some portion of the organic material to soluble and assimilable carbohydrates is of importance, for development of soil bacteria, cheaply and effectively.

I may of course add to the mass at any suitable stage of the operation nutrient material for bacteria, such for example as carbohydrates, molasses being satisfactory in some cases. It is preferable to have present with such material lime to prevent any acidity and in fact saccharate of lime is a useful addition, or a mixture of lime and molasses.

The composition having been treated with alkali material as indicated, I now proceed to introduce the bacteria, which may be added in the form of an inoculation solution or otherwise. While I do not wish to limit myself to the use of any particular species of bacteria or groups of bacteria, I prefer as stated to inoculate the soil with a wide range of bacteria in order to have present all the bacteria necessary to meet the requirements of plant growth under the conditions which may be met with in agricultural operations.

The bacteria which I prefer to add are the following: symbiotic bacteria such as radicicola and non-symbiotic such as *Azobacter vinelandii*, *Azotobacter crococum*, *clostridium*, *rossica* and the like. Also other forms of bacteria useful for agricultural purposes including ammonifiers, desulfurizing bacteria, urea formers. Nitrosomonas, *Bacterium desulfurens* and nitrobacters are included herein.

Useful formulæ illustrative of one or more phases of my invention are the following:

A.

| | |
|---|---|
| Humus | 2000 lbs. |
| Wood ashes | 100 " |
| Acid phosphate | 100 " |
| or | |
| Carbonate of calcium | 100 " |
| Floats | 400 " |
| Crude carbohydrate neutralized with lime | 30 " |
| Animal tankage (for ammonifiers) | 10 " |

A second digestion may now be allowed to take place which may be carried out at ordinary temperatures and pressures which will bring about reactions which are desirable. Finally the product may be dried to reduce the moisture to 20 to 30% water which may be brought about by heating to 100–200° F., in a continuous drier, preferably avoiding any complete sterilization by simply in most cases forming spores which subsequently become active. The heating operation preferably should be carried out carefully to not yield a sterile product, and by passing such material through a continuous drier, I have found that the water may be reduced to 20 to 30% under conditions which would appear to be destructive to the bacteria but which under the conditions of the present invention apparently do not cause such destruction as the material after drying has fairly active properties. However, to have available in the mass active bacteria of all the desired species, I prefer to re-inoculate the product after drying, which may be accomplished by adding 25 to 50 lbs. of the wet mass to one ton of the dry material, adding just enough water to temper the product to the desired extent.

Having thus described my invention, what I claim is:

1. The process of making a fertilizer which comprises digesting humus with phosphate rock and acid phosphate to produce reverted phosphate and render the nitrogen of the humus more available, in neutralizing the mass to secure a nutrient medium for bacteria, in digesting a second time, inoculating the mass with bacteria, in drying to reduce the content of moisture to between 20 and 30%, whereby a substantial portion of the bacteria are converted into the spore state, and in re-inoculating the mass with a suitable bacteria inoculant.

2. The process of making a fertilizer which comprises digesting humus with phosphate rock and acid phosphate, in neutralizing the mass to secure a nutrient medium for bacteria, and in inoculating the product with bacteria.

3. The process of making a fertilizer which comprises digesting humus under pressure with phosphate rock and acid phosphate, in rendering the mass substantially neutral and in inoculating the product with bacteria.

4. The process of making a fertilizer which comprises digesting humus under pressure with phosphate rock and acid phosphate.

5. The process of making a fertilizer which comprises digesting humus with other fertilizing elements to render nitrogen of the humus more available, in neutralizing the mass to secure a nutrient medium for bacteria, in drying to reduce the moisture content to between 20 and 30%, and in inoculating the product with a plurality of species of bacteria.

In testimony whereof I affix my signature in presence of two witnesses.

JOHN N. HOFF.

Witnesses:
E. F. CALLAN,
F. C. DUNKEL.